(12) United States Patent
Xie et al.

(10) Patent No.: US 11,368,453 B2
(45) Date of Patent: Jun. 21, 2022

(54) NETWORK CONFIGURATION METHOD AND DEVICE, ELECTRONIC DEVICE AND STORAGE MEDIUM

(71) Applicant: BEIJING XIAOMI MOBILE SOFTWARE CO., LTD., Beijing (CN)

(72) Inventors: Rongkang Xie, Beijing (CN); Shaoze Ma, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 143 days.

(21) Appl. No.: 16/927,631

(22) Filed: Jul. 13, 2020

(65) Prior Publication Data
US 2021/0152539 A1 May 20, 2021

(30) Foreign Application Priority Data
Nov. 15, 2019 (CN) .......................... 201911122609.5

(51) Int. Cl.
H04L 9/40 (2022.01)
H04L 12/66 (2006.01)
(Continued)

(52) U.S. Cl.
CPC .......... *H04L 63/083* (2013.01); *H04L 9/3213* (2013.01); *H04L 12/66* (2013.01);
(Continued)

(58) Field of Classification Search
None
See application file for complete search history.

(56) References Cited

U.S. PATENT DOCUMENTS 8,886,934 B2 * 11/2014 Eckert ................ H04L 63/0869
713/168
9,253,621 B2 * 2/2016 Foti .......................... H04W 8/10
(Continued)

FOREIGN PATENT DOCUMENTS

CN 105376738 A 3/2016
CN 105744595 A 7/2016
(Continued)

OTHER PUBLICATIONS

First Office Action of the Chinese application No. 201911122609.5, dated Aug. 4, 2021.
(Continued)

Primary Examiner — Lashonda Jacobs-Burton
(74) Attorney, Agent, or Firm — Syncoda LLC; Feng Ma

(57) ABSTRACT

A network configuration method includes: a first connection is established with an access gateway based on a first network identifier of the access gateway; a first request sent by the access gateway is received through the first connection; a first connection token is sent in response to the first request; a second network identifier encrypted by the access gateway with the first connection token when the access gateway determines that the first connection token is a valid token is received on the first connection; and the second network identifier is acquired through decryption, and a second connection is established with the access gateway based on the second network identifier for interaction with a second device through the second connection.

20 Claims, 9 Drawing Sheets

(51) Int. Cl.
*H04L 41/0803* (2022.01)
*H04L 9/32* (2006.01)

(52) U.S. Cl.
CPC ...... *H04L 41/0803* (2013.01); *H04L 63/0428* (2013.01); *H04L 63/0807* (2013.01)

(56) References Cited

U.S. PATENT DOCUMENTS

| | | | |
|---|---|---|---|
| 9,814,084 B2 * | 11/2017 | Sidhu | H04W 76/10 |
| 11,212,677 B2 * | 12/2021 | Yu | H04W 48/08 |
| 2008/0040486 A1 | 2/2008 | Kezys et al. | |
| 2012/0059934 A1 * | 3/2012 | Rafiq | H04L 67/1001 |
| | | | 709/225 |
| 2012/0233672 A1 | 9/2012 | Kezys et al. | |
| 2013/0223279 A1 | 8/2013 | Tinnakornsrisuphap et al. | |
| 2014/0162600 A1 | 6/2014 | Chang et al. | |
| 2015/0072653 A1 | 3/2015 | Fan et al. | |
| 2015/0327304 A1 | 11/2015 | Tinnakornsrisuphap et al. | |
| 2016/0202674 A1 | 7/2016 | Li | |
| 2017/0006472 A1 | 1/2017 | Fan et al. | |
| 2018/0375665 A1 * | 12/2018 | Contenti | H04L 63/0442 |
| 2021/0067341 A1 * | 3/2021 | Haque | H04L 9/14 |
| 2021/0374713 A1 * | 12/2021 | De Sa Costa | G06Q 20/027 |
| 2021/0377047 A1 * | 12/2021 | Haque | H04L 9/3268 |

FOREIGN PATENT DOCUMENTS

| | | |
|---|---|---|
| CN | 107426722 A | 12/2017 |
| CN | 107872802 A | 4/2018 |
| CN | 109462850 A | 3/2019 |
| CN | 109819498 A | 5/2019 |
| CN | 109936845 A | 6/2019 |
| WO | 2015035795 A1 | 3/2015 |

OTHER PUBLICATIONS

Supplementary European Search Report in the European application No. 20189176.9, dated Nov. 17, 2020.

* cited by examiner

NETWORK CONFIGURATION METHOD AND DEVICE, ELECTRONIC DEVICE AND STORAGE MEDIUM

CROSS-REFERENCE TO RELATED APPLICATION

This application claims the priority to Chinese Patent Application No. 201911122609.5 filed on Nov. 15, 2019, the disclosure of which is hereby incorporated by reference in its entirety.

BACKGROUND

The Internet of Things (IoT) is an important part of next-generation information technologies as well as an important development stage of the "information" age. As the name suggests, the IoT is an Internet connecting things. This may have two meanings: first, the core and foundation of the IoT are still the Internet, and the IoT is a network extended and expanded based on the Internet; and second, user terminals are extended and expanded to information exchange and communication between any things, namely the things are associated. The IoT is widely applied to network convergence through communication sensing technologies such as smart sensing, recognition technology and pervasive computing, and thus is also called a third wave of development of the world information industry after the computer and the Internet.

Based on the development of IoT technologies, various IoT devices have emerged, and a Wireless Fidelity (Wi-Fi) module has become a standard configuration of an IoT device. For example, most of intelligent air conditioners and intelligent air purifiers are configured with Wi-Fi modules.

SUMMARY

The present disclosure generally relates to the technical field of the Internet of Things (IoT), and more specifically to a network configuration method and device, an electronic device and a storage medium.

According to a first aspect of embodiments of the present disclosure, a network configuration method is provided, which may be applied to a first device and include: a first connection is established with an access gateway based on a first network identifier of the access gateway; a first request sent by the access gateway is received through the first connection; a first connection token is sent in response to the first request; a second network identifier encrypted by the access gateway with the first connection token when the access gateway determines that the first connection token is a valid token is received on the first connection; and the second network identifier is acquired through decryption, and a second connection is established with the access gateway based on the second network identifier for interaction with a second device through the second connection.

According to a second aspect of the embodiments of the present disclosure, a network configuration method is provided, which may be applied to an access gateway and include that: a first connection is established with a first device based on a pre-stored first network identifier; a first request is sent to the first device through the first connection; and a first connection token is received in response to the first request; responsive to determining that the first connection token is a valid token, a second network identifier is encrypted with the first connection token and sent to the first device; and a second connection is established with the first device based on the second network identifier to transmit interaction information between the first device and a second device.

According to a third aspect of the embodiments of the present disclosure, a network configuration device is provided, including: a processor; and a memory configured to store instructions executable by the processor, wherein the processor is configured to: establish a first connection with an access gateway based on a first network identifier of the access gateway; receive, through the first connection, a first request sent by the access gateway; a first sending portion, configured to send a first connection token in response to the first request; receive, through the first connection, a second network identifier encrypted by the access gateway with the first connection token when the access gateway determines that the first connection token is a valid token; and acquire the second network identifier through decryption and establish a second connection with the access gateway based on the second network identifier for interaction with a second device through the second connection.

According to a fourth aspect of the embodiments of the present disclosure, a network configuration device is provided, including: a processor; and a memory configured to store instructions executable by the processor, wherein the processor is configured to: establish a first connection with a first device based on a pre-stored first network identifier; send a first request to the first device through the first connection; receive a first connection token sent in response to the first request; responsive to determining that the first connection token is a valid token, encrypt a second network identifier with the first connection token and send an encrypted second network identifier to the first device; and establish a second connection with the first device based on the second network identifier to transmit interaction information between the first device and a second device.

According to a fifth aspect of the embodiments of the present disclosure, a storage medium is provided, wherein an instruction in the storage medium may be executed by a processor of a first device to enable the first device to perform the network configuration method of the first aspect, or, the instruction in the storage medium may be executed by a processor of an access gateway to enable the access gateway to perform the network configuration method of the second aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
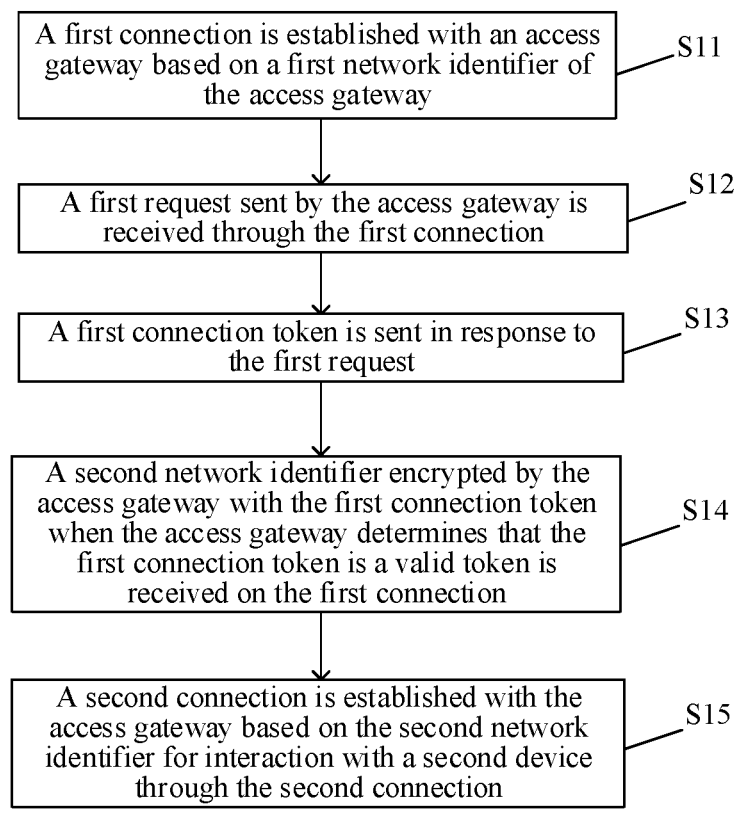
FIG. 1 is a first flowchart showing a network configuration method according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

FIG. 1 is a first flowchart showing a network configuration method, according to some embodiments of the present disclosure. The network configuration method is applied to a first device, and as shown in FIG. 1, includes the following steps.

In S11, a first connection is established with an access gateway based on a first network identifier of the access gateway.

In S12, a first request sent by the access gateway is received through the first connection.

In S13, a first connection token is sent in response to the first request, the first connection token being configured to identify the first device.

In S14, a second network identifier encrypted by the access gateway with the first connection token when the access gateway determines that the first connection token is a valid token is received on the first connection.

In S15, a second connection is established with the access gateway based on the second network identifier for interaction with a second device through the second connection.

In these embodiments of the present disclosure, the first device refers to an IoT device required to perform information interaction with another device, and includes an intelligent home device that may move automatically or may not move automatically, for example, a sweeping robot, an intelligent speaker or an intelligent television.

For example, the IoT device includes a Wi-Fi module, and the IoT device performs information interaction with the other device based on the Wi-Fi module. For example, the intelligent speaker performs information interaction with a mobile phone client of the intelligent home device based on a built-in Wi-Fi module; or, the intelligent speaker performs information interaction with the intelligent television based on the built-in Wi-Fi module.

In these embodiments of the present disclosure, the network identifier includes a Service Set Identifier (SSID), the SSID being configured to distinguish different networks. The SSID may be the name of a local area network, and devices set with the same SSID value may communicate with one another in the local area network. In these embodiments of the present disclosure, the first network identifier may be a first SSID.

In S11, the first network identifier is stored in the access gateway. It is to be noted that, in some embodiments of the present disclosure, the first network identifier may be hidden in the access gateway, and the first network identifier is mainly configured for the first device to acquire information required by network configuration. In these embodiments of the present disclosure, the access gateway may be a device providing network configuration service for a router, an intelligent speaker and the like.

After scanning the first network identifier, the first device, sends a first connection request to the access gateway based on the first network identifier, the first connection request containing a Media Access Control (MAC) address header and device information of the first device, acquires an allocated Internet Protocol (IP) address from the access gateway based on a Dynamic Host Configuration Protocol (DHCP) and establishes the first connection with the access gateway based on the IP address.

In S12 and S13, the first device may receive the first request sent by the access gateway and send the first connection token based on the first request. The first request may be sent to the first device by the access gateway based on a User Datagram Protocol (UDP).

In these embodiments of the present disclosure, the first connection token is an encryption root key for local area network communication such that the access gateway may conveniently encrypt the second network identifier to be transmitted with the encryption root key for sending. The first connection token is unique and configured to identify the first device. The first token may be an encryption root key randomly generated by the first device and including, for example, at least 16 bytes. The first connection token may also be burnt in the first device in advance before delivery of the first device. In S14, the first connection token is a valid token. For example, the first connection token is not an all-"00" or all-"ff" value. The access gateway sends the encrypted second network identifier only after determining that the first connection token is a valid token. The second network identifier at least includes a second SSID of the access gateway, the second SSID being different from the first SSID. The second network identifier may further include password information matched with the second SSID.

It is to be noted that, in these embodiments of the present disclosure, the first request received by the first device may further include a request for the device information and present timestamp information, the first device, besides sending the first connection token, may also send the device and a present timestamp to the access gateway, and the device information at least includes a Device Identifier (DID) of the first device and may further include a device type and/or a device name, etc. The present timestamp may be configured to detect whether the encrypted second network identifier is received by the first device in a time range to confirm whether the encrypted second network identifier is tampered.

In these embodiments of the present disclosure, an encryption algorithm may be pre-stored in the access gateway and the first device. If the encryption algorithm is a symmetric encryption algorithm, after the access gateway sends the encrypted second network identifier to the first device by use of the first connection token, the first device may acquire the second network identifier through decryption with the first connection token. When an asymmetric encryption algorithm is stored in the access gateway and the first device, the first device may also perform decryption by use of a pre-stored private key.

It can be understood that, in these embodiments of the present disclosure, the second network identifier received by the first device and configured for network configuration is transmitted after being encrypted by the access gateway with the first connection token of the first device, so that the security of the second network identifier received by the first device is ensured.

In a software-routing-based network configuration method, smart hardware is the first device in some embodiments of the present disclosure, a mobile phone is required to find an Access Point (AP) of the smart hardware at first, network configuration information (an SSID and a password), acquired by the smart hardware, of the access gateway is manually input into the mobile phone by a user of the mobile phone and sent through the mobile phone, and after sending the network configuration information to the smart hardware, the mobile phone is further required to be manually switched back to the AP of the access gateway. It can be understood that network configuration intelligence is relatively low in this process.

In some embodiments of the present disclosure, the first connection is established based on the first network identifier of the access gateway to automatically obtain the second network identifier encrypted with the first connection token through the first connection, and the second network identifier is acquired through decryption for network configuration. In this process, manual operations of the user are avoided, so that the intelligence degree of network configuration is improved.

In a Wi-Fi Protected Setup (WPS)-based network configuration manner, the user is required to simultaneously press a WPS button for network configuration. It can be understood that: when this manner is adopted, on one hand, the WPS is required to be set, so that the hardware cost is increased; and on the other hand, the user is required to simultaneously press the WPS button, so that the user experience is poor. In the present disclosure, cooperative operations of the user are avoided on the basis of not increasing the hardware cost, so that the user experience may be improved.

In addition, in these embodiments of the present disclosure, for increasing the success rate of network configuration, authenticating whether the first device and the access gateway are legal devices before the access gateway sends the encrypted second network identifier to the first device may also be considered. A legal device refers to a device produced by the same manufacturer. A one-way or two-way authentication manner may be adopted. For example, for one-way authentication, a key or a security chip with a server signature certificate may be preset in the first device, and the first device is required to perform challenge authentication with the server through the access gateway to determine whether it is a legal device. For two-way authentication, the first device is not only required to perform challenge authentication with the server through the access gateway, and the access gateway is also required to perform challenge authentication with the server through the first device.

In some embodiments, the method further includes that:
a second request sent by the access gateway is received through the first connection, and
security capability information containing an encryption algorithm supported by the first device is sent to the access gateway in response to the second request; and
S14 includes that:
the second network identifier encrypted by the access gateway with the first connection token through the encryption algorithm supported by the first device when the access gateway determines that the first connection token is a valid token is received.

In some embodiments, if the encryption algorithm is not pre-stored in the first device and the access gateway, the access gateway may also send the second request to the first device, and the first device sends the security capability information containing the encryption algorithm supported by the first device to the access gateway based on the second request. The security capability information includes a cryptographic security algorithm supported by the first device, for example, a key negotiation algorithm, a symmetric encryption algorithm and a signature algorithm. In such case, the encrypted second network identifier received by the first device is obtained by encryption by the access gateway with the first connection token through the encryption algorithm matched with a present security capability of the first device.

In these embodiments of the present disclosure, when the security capability information includes the key negotiation algorithm, the first device and the access gateway may also negotiate to generate a new encryption key and decryption key, namely the first connection token is updated to encrypt the second network identifier and the decryption key is used for decryption.

It can be understood that the present security capability information of the first device, for example, an encryption algorithm obtained by upgrading the pre-stored encryption algorithm by the first device, is acquired, so that the transmission security of the second network identifier may be improved.

In some embodiments, the security capability information further contains information about an authentication manner supported by the first device, the authentication manner is configured to be sent to a server by the access gateway, and the method further includes that:
security authentication success information provided by the server and forwarded by the access gateway is received through the first connection, the second network identifier being sent by the access gateway after receiving the security authentication success information.

In some embodiments, the first device sends the security capability information including the information about the authentication manner supported by the first device to the access gateway based on the second request, and after receiving the information, the access gateway sends the authentication manner to the server for a server side to verify the first device.

In some embodiments, the authentication manner includes an Out of Band (OOB) authentication, and the OOB authentication is an authentication that is performed on a channel different from the first connection, and is mainly adopted for the user to confirm whether the first device is his/her own device requiring network configuration. For example, if the device has a camera capable of scanning a two-dimensional code, an Application (APP) of the mobile phone displays a pairing code for the device to scan in form of a two-dimensional code. Another OOB interaction manner such as a Near Field Communication (NFC) manner and a voice may also be adopted. There are no limits made in the embodiment of the present disclosure. Based on participation of the user through the APP of the mobile phone, the server may return user confirmation information to the access gateway.

As described above, the first device may also send the device information to the access gateway. When the first device does not support the OOB interaction manner, the access gateway may also send the device information to the server, and the server sends the device information to the APP of the mobile phone and, after confirmation of the user, for example, clicking an OK button, returns the user confirmation information to the access gateway. In such case, the user confirmation information received by the access gateway is security authentication success information.

After receiving the security authentication success information, the access gateway may send the second network identifier encrypted with the first connection token to the first device.

It can be understood that the encrypted second network identifier received by the first device is sent by the access gateway after receiving the security authentication success information, so that network configuration may be implemented based on the participation of the user after the user confirms that the device is his/her own device requiring network configuration, and the network configuration security may be improved.

In another example, the first device supports screen displaying, and the first device displays a dynamically generated Personal Identification Number (PIN) code. After seeing the PIN code, the user of the first device inputs the PIN code displayed on the first device to the APP of the mobile phone, the APP of the mobile phone sends the PIN code to the server, and the server transmits the PIN code to the access gateway to complete further authentication to further improve the network configuration security.

In some embodiments, if the security authentication success information contains a first identification code, the method further includes:

matching authentication is performed based on the first identification code and a second identification code locally stored in the first device, the second network identifier being sent by the access gateway after receiving matching authentication success information.

In some embodiments, the first identification code may be the first PIN code received by the access gateway and transmitted by the server, and the first PIN code transmitted by the server is manually input to the APP of the mobile phone by the user after seeing a second PIN code on a display screen of the first device, sent to the server through the APP of the mobile phone and sent to the access gateway by the server. Therefore, the first PIN code received by the access gateway should theoretically be consistent with the second PIN code. A PIN code may be intercepted, so that the access gateway, after receiving the first PIN code transmitted by the server, may perform matching authentication with the second identification code locally stored in the first device, for example, the second PIN code.

When matching authentication is performed, a two-way matching authentication manner may be adopted, and a one-way matching authentication manner may also be adopted. There are no limits made in the embodiment of the present disclosure.

Figure 2:
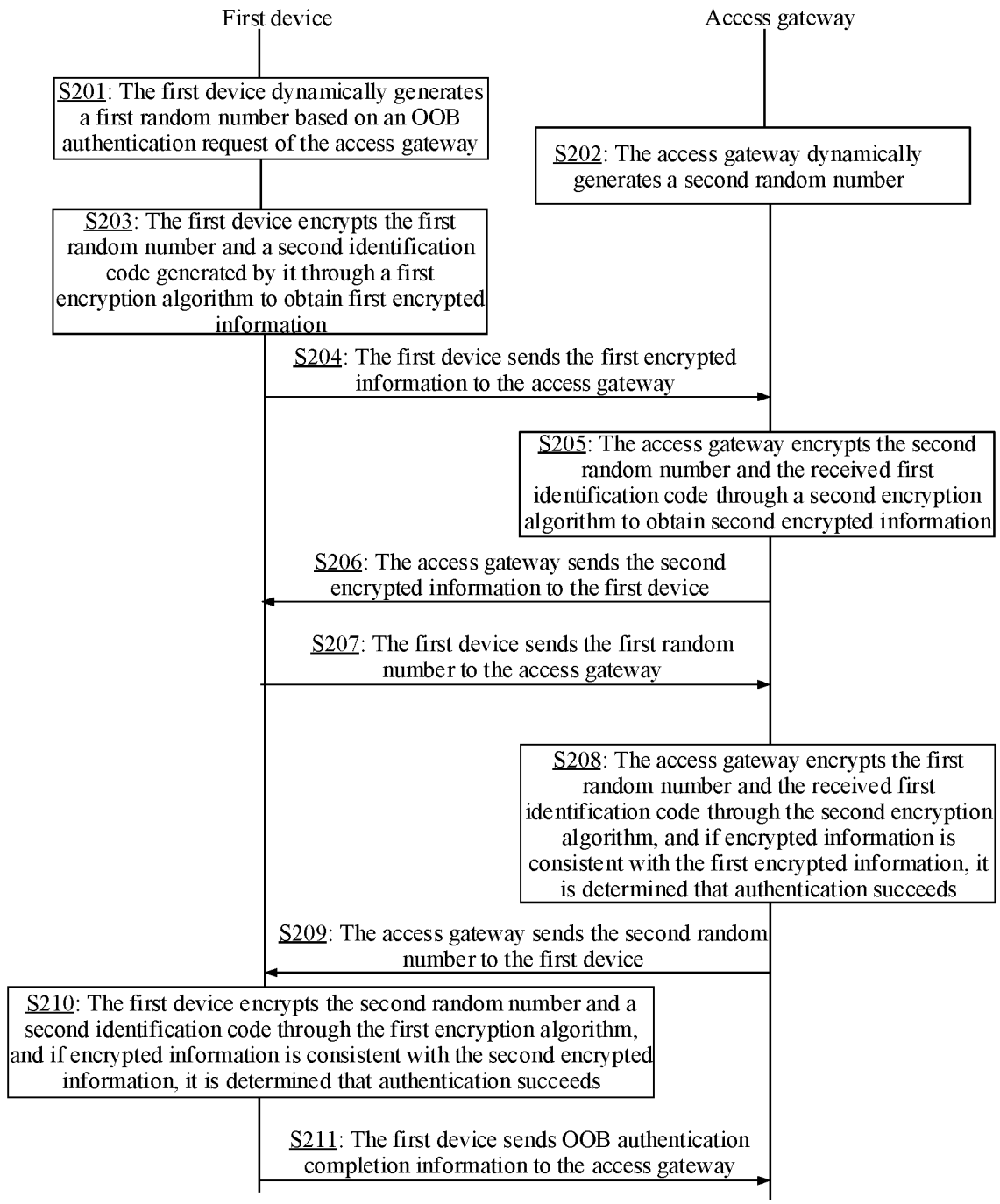
FIG. 2 is an exemplary flowchart showing two-way matching authentication according to some embodiments of the present disclosure.

FIG. 2 is an exemplary flowchart showing two-way matching authentication, according to some embodiments of the present disclosure. As shown in FIG. 2, the two-way matching authentication flow includes the following steps.

In S201, the first device dynamically generates a first random number based on an OOB authentication request of the access gateway.

In S202, the access gateway dynamically generates a second random number.

It is to be noted that S201 and S202 do not represent execution sequences, the first device and the access gateway may generate the random numbers at the same time or at different time and, when the random numbers are generated at different time, a generation sequence of the first random number and the second random number is not limited. For example, both the first random number and the second random number are random numbers including at least 16 bytes. The first random number is a device random number (dev_random) generated by the first device, and the second random number is an APP random number (app_random) generated by the access gateway.

In S203, the first device encrypts the first random number and the second identification code generated by it through a first encryption algorithm to obtain first encrypted information.

The first encryption algorithm may be a hash algorithm, and the obtained first encrypted information may be a first device encrypted value (dev_sign1) obtained by encrypting the second PIN code through the hash algorithm.

In S204, the first device sends the first encrypted information to the access gateway.

That is, the first device sends the first encrypted information to the access gateway.

In S205, the access gateway encrypts the second random number and the received first identification code through a second encryption algorithm to obtain second encrypted information.

The second encryption algorithm may be a hash algorithm different from that in S203, and the obtained second encrypted information may be a first APP encrypted value (app_sign1) obtained by encrypting the first PIN code through the hash algorithm.

In S206, the access gateway sends the second encrypted information to the first device.

That is, the access gateway sends the first APP encrypted value to the first device.

In S207, the first device sends the first random number to the access gateway.

In S208, the access gateway encrypts the first random number and the received first identification code through the second encryption algorithm, and if encrypted information is consistent with the first encrypted information, it is determined that authentication succeeds.

For example, if the information obtained by encrypting the first random number and the first identification code by the access gateway is a second device encrypted value (dev_sign2), when the second device encrypted value is consistent with the first device encrypted value received in S204, it is determined that authentication succeeds.

It is to be noted that, in some embodiments, it may also be set that S209 to S210 are continued to be executed only after the first device passes authentication of the access gateway, namely authentication in the step succeeds. If authentication in S208 fails, the access gateway may not send the encrypted second network identifier to the first device.

In S209, the access gateway sends the second random number to the first device.

In S210, the first device encrypts the second random number and the second identification code through the first encryption algorithm, and if encrypted information is consistent with the second encrypted information, it is determined that authentication succeeds.

For example, if the information obtained by encrypting the second random number and the second identification code by the first device is a second APP encrypted value (app_sign2), when the second APP encrypted value is consistent with the first APP encrypted value received in S206, it is determined that authentication succeeds.

In S211, the first device sends OOB authentication completion information to the access gateway.

The OOB authentication completion information is the security authentication success information.

In these embodiments of the present disclosure, if the security authentication success information further contains the first identification code, authentication matching is performed on the first identification code and the second identification code stored in the first device, and the first device receives the encrypted second network identifier after passing matching authentication, so that the network configuration security may further be improved.

In some embodiments, the method further includes that:

after the second connection is established with the access gateway, a second connection token is generated, the second connection token being configured to identify the first device; and the second connection token is sent to the server through the access gateway via the second connection.

In some embodiments, the first device establishes the second connection with the access gateway, namely network configuration of the first device succeeds. After successful network configuration, the first device may update the first connection token to generate the second connection token and send the second connection token to the server through the access gateway. It is to be noted that the server may record information about the device that the second connection token belongs to, namely the server stores a corresponding relationship between the second connection token and the device information. Through the stored corresponding relationship, the server is notified that the first device is a device that network configuration has been performed on, i.e., its own device, on one hand, and on the other hand, in a subsequent roaming or online modification process of the second network identifier, the server eliminates an authentication flow for the first device based on the fact that the first device has been its own device to rapidly implement new network configuration. Roaming refers to that the first device is connected with a new access gateway or the access gateway modifies the second network identifier. Online password changing refers to that the second network identifier of the access gateway is changed when the first device establishes the second connection with the access gateway.

In these embodiments of the present disclosure, for example, the access gateway modifies the second network identifier. In some embodiments, the method further includes that:

responsive to failing to connect to the access gateway using the second network identifier, the first connection is reestablished with the access gateway based on the first network identifier;

a third request sent by the access gateway is received through the reestablished first connection;

an invalid third connection token is sent in response to the third request, the invalid third connection token being configured to trigger the access gateway to acquire the second connection token from the server;

a third network identifier encrypted with the second connection token is received from the access gateway through the first connection; and the third network identifier is acquired through decryption, and the third connection is established with the access gateway based on the third network identifier for interaction with the second device through the third connection.

In some embodiments, after acquiring the second network identifier through decryption, the first device may connect to a local area network supported by the access gateway according to the second network identifier. However, after the access gateway modifies the second network identifier, when reestablishing the second connection with the access gateway based on the second network identifier, the first device cannot successfully establish the second connection. In such case, the first device may reestablish the first connection with the access gateway by use of the first network identifier and receive the third request of the access gateway. The third request may be sent to the first device by the access gateway based on the UDP. The first device sends the invalid third connection token in response to the third request to trigger the access gateway to acquire the second connection token from the server.

Exemplarily, the invalid third token may be all-"00" or all-"ff" data including at least 16 bytes. The access gateway may know that invalid third connection token according to the all-"00" or all-"ff" data and acquire the valid second connection token from the server.

It is to be noted that the third request received by the first device may further include a request for the device information and the present timestamp, and the first device, besides sending the first connection token, may also send the device and the present timestamp to the access gateway. After receiving the device information, the access gateway may send the device information to the server. After determining according to the device information that the first device is a device that has been bound, the server directly sends the second connection token matched with the device information to the access gateway, such that the access gateway encrypts the third network identifier with the second connection token and sends encrypted network configuration data to the first device. The first device acquires the third network identifier through decryption with the decryption key, for example, with the second connection token under the condition that the symmetric encryption algorithm is adopted, and then may join the local area network supported by the third access gateway again. The third network identifier may include a third SSID different from the second SSID.

It is to be noted that, when the first device accesses a new router, the same manner may also be adopted, and elaborations are omitted in these embodiments of the present disclosure. In addition, when the first device is connected with the access gateway based on the second network identifier, a connection time length for connection based on the second network identifier may be set. For example, if the access gateway is not connected in 30 s, the first network identifier is started to be scanned to reestablish the first connection. Of course, a scanning time length for the first network identifier may also be set. For example, if the first network identifier is not scanned in 30 s, switching to connection establishment based on the second network identifier is executed. It can be understood that, in some embodiments, connection based on the second network identifier and the first network identifier is tried alternately, so that the first device may finally join the local area network supported by the access gateway in a manner, and the user experience is improved.

It can be understood that, in the roaming process, after the user changes the access gateway or the access gateway modifies the second network identifier, the first device may automatically scan and update network configuration information and manual configuration of the user is avoided, so that the intelligence degree of network configuration is improved.

When the access gateway modifies the second network identifier on line, the method further includes that:

the third network identifier encrypted with the second connection token is received from the access gateway through the second connection, the second connection token being acquired from the server by the access gateway after receiving a setting instruction for the third network identifier; and the third network identifier is acquired through decryption, and the third connection is established with the access gateway based on the third network identifier for interaction with the second device through the third connection.

In some embodiments, if the second network identifier of the access gateway is changed, after receiving the setting instruction for the third network identifier, the access gateway may request the server for the second connection token stored in the server. After encrypting the third network identifier with the second connection token, the access gateway may send the encrypted third network identifier to the first device.

After sending the encrypted third network identifier to the first device, the access gateway restarts to validate the third network identifier. After the third network identifier of the access gateway is validated, the first device may acquire the third network identifier through decryption with the decryption key, for example, with the second connection token under the condition that the symmetric encryption algorithm is adopted, and then may join the local area network supported by the third access gateway again.

It can be understood that, in the process that the access gateway modifies the second network identifier on line, the access gateway may automatically synchronize the updated third network identifier to the first device and manual configuration of the user is also avoided, so that the user experience may be improved.

Figure 3:
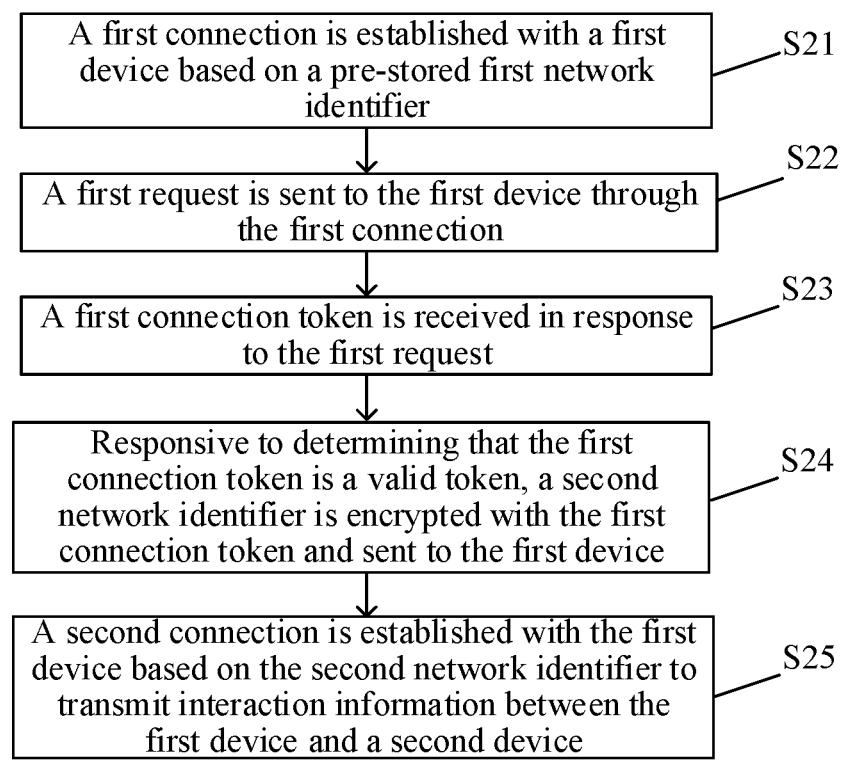
FIG. 3 is a second flowchart showing a network configuration method according to some embodiments of the present disclosure.

FIG. 3 is a second flowchart showing a network configuration method, according to some embodiments of the present disclosure. The network configuration method is applied to an access gateway, and as shown in FIG. 3, includes the following steps.

In S21, a first connection is established with a first device based on a pre-stored first network identifier.

In S22, a first request is sent to the first device through the first connection.

In S23, a first connection token is received in response to the first request.

In S24, responsive to determining that the first connection token is a valid token, a second network identifier is encrypted with the first connection token and sent to the first device.

In S25, a second connection is established with the first device based on the second network identifier to transmit interaction information between the first device and a second device.

In these embodiments of the present disclosure, the access gateway may be a device providing network configuration service for a router, an intelligent speaker and the like. The first network identifier may be hidden in the access gateway, and the first network identifier is mainly configured for the first device to acquire information required by network configuration.

In S21, the first device is in a Station (STA) mode. In the STA mode, the first device may automatically scan the first network identifier of the access gateway, and the access gateway allocates an IP address to the first device according to a first connection request sent by the first device and establishes the first connection with the first device based on the IP address.

In S22 and S23, the access gateway may send the first request to the first device to acquire the first connection token. The first connection token is an encryption root key for local area network communication such that the access gateway may conveniently encrypt the second network identifier to be transmitted with the encryption root key for sending when an encryption algorithm is used. The first connection token is unique and configured to identify the first device. The first connection token may be an encryption root key randomly generated by the first device and including, for example, at least 16 bytes. The first connection token may also be burnt in the first device in advance before delivery of the first device.

It is to be noted that, in these embodiments of the present disclosure, the first request sent by the access gateway may further include a request for device information and present timestamp information, and the access gateway, besides receiving the first connection token, may also receive information such as the device information and a present timestamp.

In these embodiments of the present disclosure, an encryption algorithm may be pre-stored in the access gateway and the first device. If the encryption algorithm is a symmetric encryption algorithm, after the access gateway encrypts the second network identifier with the first connection token and sends it to the first device, the first device may acquire the second network identifier through decryption with the first connection token. When an asymmetric encryption algorithm is stored in the access gateway and the first device, the first device may also perform decryption by use of a pre-stored private key.

It can be understood that, in these embodiments of the present disclosure, the access gateway encrypts its own second network identifier with the first connection token of the first device for sending, so that the sending security of the second network identifier is ensured.

In some embodiments, the method further includes that:

a second request is sent to the first device through the first connection, and security capability information containing an encryption algorithm supported by the first device is received from the first device in response to the second request; and S24 includes that:

the second network identifier encrypted with the first connection token through an encryption algorithm supported by the first device is sent.

In some embodiments, if the encryption algorithm is not pre-stored in the first device and the access gateway, the access gateway may also send the second request to the first device, and the first device sends the security capability information containing the encryption algorithm supported by the first device to the access gateway based on the second request. The security capability information includes a cryptographic security algorithm supported by the first device, for example, a key negotiation algorithm, a symmetric encryption algorithm and a signature algorithm. In such case, the encrypted second network identifier received by the first device is obtained by encryption by the access gateway with the first connection token through the encryption algorithm matched with a present security capability of the first device.

In these embodiments of the present disclosure, when the security capability information includes the key negotiation algorithm, the first device and the access gateway may also negotiate to generate a new encryption key and decryption key, namely the first connection token is updated to encrypt the second network identifier and the decryption key is used for decryption.

It can be understood that the access gateway acquires the present security capability information of the first device, for example, an encryption algorithm obtained by upgrading the pre-stored encryption algorithm by the first device, so that the transmission security of the second network identifier may be improved.

In some embodiments, the security capability information further contains information about an authentication manner supported by the first device; the method further includes that:

the security authentication manner is sent to a server, and security authentication success information is sent to the first device through the first connection, the security authentication success information being fed back to the access gateway by the server after authenticating the first device; and the operation that the second network identifier encrypted with the first connection token through the encryption algorithm supported by the first device is sent includes that:

after the security authentication success information is fed back to the first device, the second network identifier encrypted with the first connection token through the encryption algorithm supported by the first device is sent.

In some embodiments, the access gateway may send the information about the authentication manner supported by the first device to the server for a server side to verify the first device.

Exemplarily, if the first device supports an OOB manner, based on the participation of a user, after an APP of a mobile phone of the user interacts with the first device, the APP of the mobile phone sends user confirmation information to the server, and the server may return the user confirmation information to the access gateway.

As described above, the first device may also send the device information to the access gateway. When the first device does not support the OOB interaction manner, the access gateway may also send the device information to the server, and the server sends the device information to the APP of the mobile phone and, after confirmation of the user, for example, clicking an OK button, returns the user confirmation information to the access gateway. In such case, the user confirmation information received by the access gateway is security authentication success information.

After receiving the security authentication success information, the access gateway may send the second network identifier encrypted with the first connection token to the first device.

It can be understood that the encrypted second network identifier sent by the access gateway is sent after the security authentication success information is received, so that network configuration may be implemented based on the participation of the user after the user confirms that the device is his/her own device requiring network configuration, and the network configuration security may be improved.

For another example, the first device supports screen displaying, and the first device displays a dynamically generated PIN code. After seeing the PIN code, the user of the first device inputs the PIN code displayed on the first device to the APP of the mobile phone, the APP of the mobile phone sends the PIN code to the server, and the access gateway may receive the PIN code transmitted by the server and perform authentication with the first device to further improve the network configuration security.

In some embodiments, if the security authentication success information contains a first identification code, the method further includes that:

matching authentication is performed based on the first identification code and a second identification code locally stored in the first device; and the operation that the second network identifier encrypted with the first connection token through the encryption algorithm supported by the first device is sent includes that:

responsive to successful matching authentication, the second network identifier encrypted with the first connection token through the encryption algorithm supported by the first device is sent.

In some embodiments, after receiving the first identification code (for example, the first PIN code) transmitted by the server, the access gateway may perform matching authentication with the second identification code (for example, a second PIN code) locally stored in the first device.

When matching authentication is performed, a two-way matching authentication manner may be adopted, and a one-way matching authentication manner may also be adopted. There are no limits made in the embodiment of the present disclosure.

A process that the access gateway and the first device perform matching authentication on the first identification code and the second identification code is shown in FIG. 2 and will not be elaborated in the present disclosure.

In these embodiments of the present disclosure, if the security authentication success information further contains the first identification code, authentication matching is performed on the first identification code and the second identification code stored in the first device, and the access gateway sends the encrypted second network identifier after successful matching authentication, so that the network configuration security may further be improved.

In some embodiments, the method further includes that:

responsive to that the first device fails to connect to the access gateway using the second network identifier, the first connection is reestablished with the first device; a third request is sent to the first device through the reestablished first connection;

an invalid third connection token is received in response to the third request;

a second connection token is acquired from the server according to the third connection token, the second connection token being updated after the first device establishes the second connection with the access gateway and the second connection token being configured to identify the first device;

a third network identifier encrypted with the second connection token is sent to the first device through the reestablished first connection; and the third network identifier is acquired through decryption, and a third connection is established with the first device based on the third network identifier to transmit the interaction information between the first device and the second device.

In some embodiments, after acquiring the second network identifier through decryption, the first device may connect to a local area network supported by the access gateway according to the second network identifier. However, after the access gateway modifies the second network identifier, when reestablishing the second connection with the access gateway based on the second network identifier, the first device may not succeed in reestablishing, and the access gateway is triggered to acquire the second connection token from the server.

It is to be noted that, for the second connection token in the server, the second connection token is generated after successful network configuration of the first device and the second connection token is sent to the server through the access gateway based on the second connection with the access gateway and stored in the server.

In some embodiments, if the first device may not establish the connection with the access gateway based on the second network identifier, the first device may reestablish the first connection with the access gateway by use of the first network identifier. The access gateway may send the third request to the first device through the reestablished first connection, and the third request may be sent to the first device by the access gateway based on a UDP. The access gateway may receive the invalid third connection token sent by the first device in response to the third request. Exemplarily, the invalid third token may be all-"00" or all-"ff" data including at least 16 bytes. The access gateway may know that invalid third connection token according to the all-"00" or all-"ff" data and acquire the valid second connection token from the server.

It is to be noted that the third request sent by the access gateway may further include the request for the device information and the present timestamp, and the access gateway, besides receiving the first connection token, may also receive the information such as the device information and the present timestamp. After receiving the device information, the access gateway may send the device information to the server. After determining according to the device information that the first device is a device that has been bound, the server directly sends the second connection token matched with the device information to the access gateway such that the access gateway encrypts the third network identifier with the second connection token and sends encrypted network configuration data to the first device.

It can be understood that, after the user changes the access gateway or the access gateway modifies the second network identifier, the access gateway updates the network configuration information to the first device based on the third request of the first device and manual configuration of the user is avoided, so that the intelligence degree of network configuration is improved.

In some embodiments, the method further includes that:

a setting instruction for the third network identifier is received through the second connection;

the second connection token is acquired from the server according to the setting instruction, the second connection token being updated after the first device establishes the second connection with the access gateway and the second connection token being configured to identify the first device;

the third network identifier encrypted with the second connection token is sent to the first device through the second connection; and the third network identifier is acquired through decryption, and the third connection is established with the first device based on the third network identifier to transmit the interaction information between the first device and the second device.

In some embodiments, if the first device establishes the second connection with the access gateway, when the second network identifier of the access gateway is changed, after detecting the setting instruction for the third network identifier, the access gateway may request the server for the second connection token stored in the server. After encrypting the changed third network identifier with the second connection token, the access gateway sends the encrypted third network identifier to the first device.

After sending the encrypted third network identifier to the first device, the access gateway restarts to validate the third network identifier. After the third network identifier of the access gateway is validated, the first device may acquire the third network identifier through decryption with the decryption key, for example, with the second connection token under the condition that the symmetric encryption algorithm is adopted, and then may join the local area network supported by the third access gateway again.

It can be understood that, when the access gateway modifies the second network identifier on line, namely in the process that the second network identifier is modified based on the second connection with the first device, the access gateway may automatically synchronize the updated third network identifier to the first device and manual configuration of the user is also avoided, so that the user experience may be improved.

Figure 4:
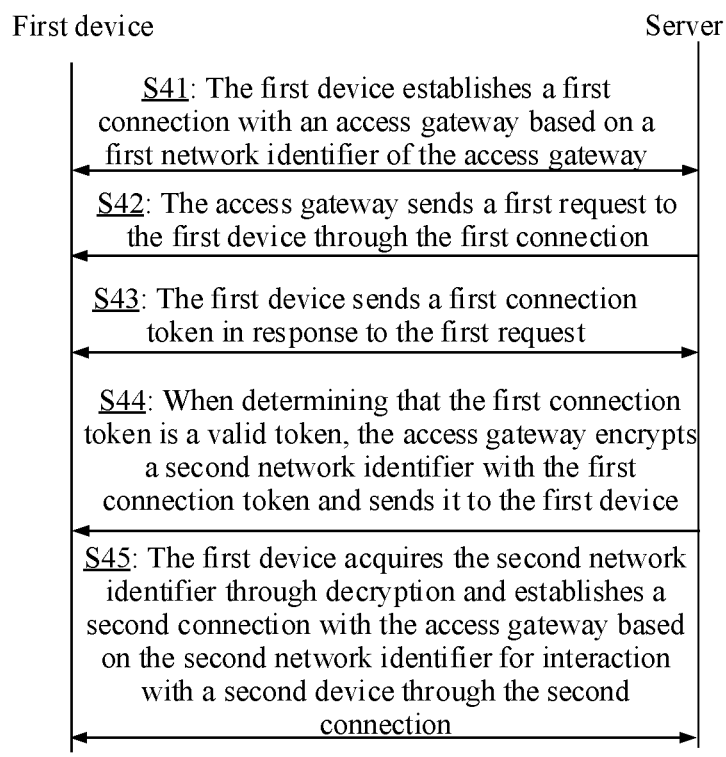
FIG. 4 is a first interaction flowchart showing a network configuration method according to some embodiments of the present disclosure.

FIG. 4 is a first interaction flowchart showing a network configuration method, according to some embodiments of the present disclosure. As shown in FIG. 4, the network configuration method applied to a first device and an access gateway includes the following steps.

In S41, the first device establishes a first connection with the access gateway based on a first network identifier of the access gateway.

In S42, the access gateway sends a first request to the first device through the first connection.

In S43, the first device sends a first connection token in response to the first request.

In S44, when determining that the first connection token is a valid token, the access gateway encrypts a second network identifier with the first connection token and sends it to the first device.

In S45, the first device acquires the second network identifier through decryption and establishes a second connection with the access gateway based on the second network identifier for interaction with a second device through the second connection.

It can be understood that, in these embodiments of the present disclosure, after establishing the first connection with the access gateway based on the first network identifier, the first device receives the second network identifier encrypted by the access gateway with the first connection token generated by the first device and, after acquiring the second network identifier through decryption, the first device establishes the second connection with the access gateway based on the second network identifier to implement interaction with the second device. In this process, the second network identifier received by the first device and configured for network configuration is transmitted after being encrypted by the access gateway with the first connection token of the first device, so that the security of the second network identifier received by the first device is ensured. Manual operations of a user are avoided, and a button for network configuration is not required to be additionally arranged on the first device, so that increase of the hardware cost of the first device is avoided, the intelligence degree of network configuration is improved, and the user experience is improved.

Figure 5:
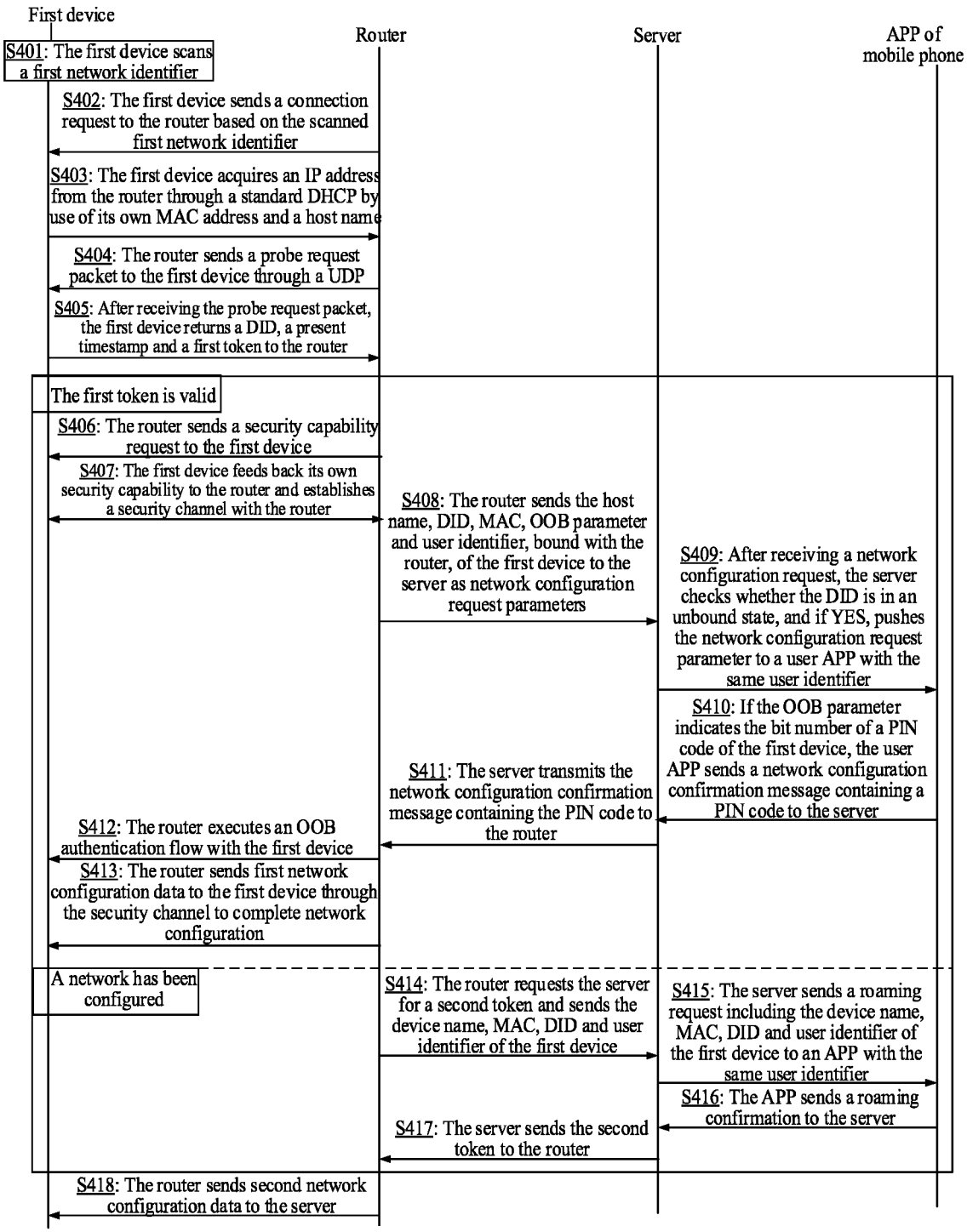
FIG. 5 is an exemplary interaction flowchart showing a network configuration method according to some embodiments of the present disclosure.

FIG. 5 is an exemplary interaction flowchart showing a network configuration method, according to some embodiments of the present disclosure. The network configuration method is applied to a first device, a router, a server and an APP of a mobile phone, and as shown in FIG. 5, includes the following steps.

In S401, the first device scans a first network identifier.

For example, the first network identifier is hidden "MIWIFI."

In some embodiments, a hidden SSID is the first network identifier.

In S402, the first device sends a connection request to the router based on the scanned first network identifier.

In S403, the first device acquires an IP address from the router through a standard DHCP by use of its own MAC address and a host name.

In S404, the router sends a probe request packet to the first device through a UDP.

In some embodiments, the probe request packet is the first request in the present disclosure.

In S405, after receiving the probe request packet, the first device returns a DID, a present timestamp and a first token to the router.

In some embodiments, the first token requested in a network configuration process is the first connection token.

In S406, when determining that the first token is a valid key (not all-00 or all-ff), the router continues a subsequent network configuration flow.

It is to be noted that, if the router determines that the first token is an invalid key, the network configuration flow is quit.

In S407, the router sends a device security capability request to the first device.

In S408, the first device feeds back its own security capability to the router and establishes a security channel with the router.

The security capability of the first device includes a cryptographic security algorithm supported by the first device, for example, a key negotiation algorithm, a symmetric encryption algorithm and a signature algorithm, and information about an OOB authentication manner supported by the device.

In some embodiments, that the first device establishes the security channel with the router refers to that interaction data between the first device and the router is encrypted with tokens.

In S409, the router sends the host name, DID, MAC, OOB parameter and user identifier, bound with the router, of the first device to the server as network configuration request parameters.

In S410, after receiving a network configuration request, the server checks whether the DID is in an unbound state, and if YES, pushes the network configuration request parameter to a user APP with the same user identifier.

In S411, if the OOB parameter indicates the bit number of a PIN code of the first device, the user APP sends a network configuration confirmation message containing a PIN code to the server.

In some embodiments, the network configuration confirmation message is the security authentication success information, the PIN code of the first device is the second identification code dynamically generated by the first device, and the PIN code contained in the network configuration confirmation message is the first identification code contained in the security authentication success information.

In S412, the server transmits the network configuration confirmation message containing the PIN code to the router.

In S413, after receiving the confirmation message, the router executes an OOB authentication flow with the first device.

The OOB authentication flow is shown in FIG. 2.

In S414, the router sends first network configuration data to the first device through the security channel to complete network configuration.

In some embodiments, the first network configuration data is the second network identifier.

In S415, after successful network configuration, the router requests the server for a second token and sends the device name, MAC, DID and user identifier of the first device.

In some embodiments, the second token requested by the router from the server after successful network configuration is the second connection token.

In S416, the server sends a roaming request including the device name, MAC, DID and user identifier of the first device to an APP with the same user identifier.

In S417, the APP sends a roaming confirmation to the server.

In S418, the server sends the second token to the router.

In some embodiments, the second token is the second connection token.

In S419, the router sends second network configuration data to the server.

In some embodiments, the second network configuration data is the third network identifier.

Figure 6:
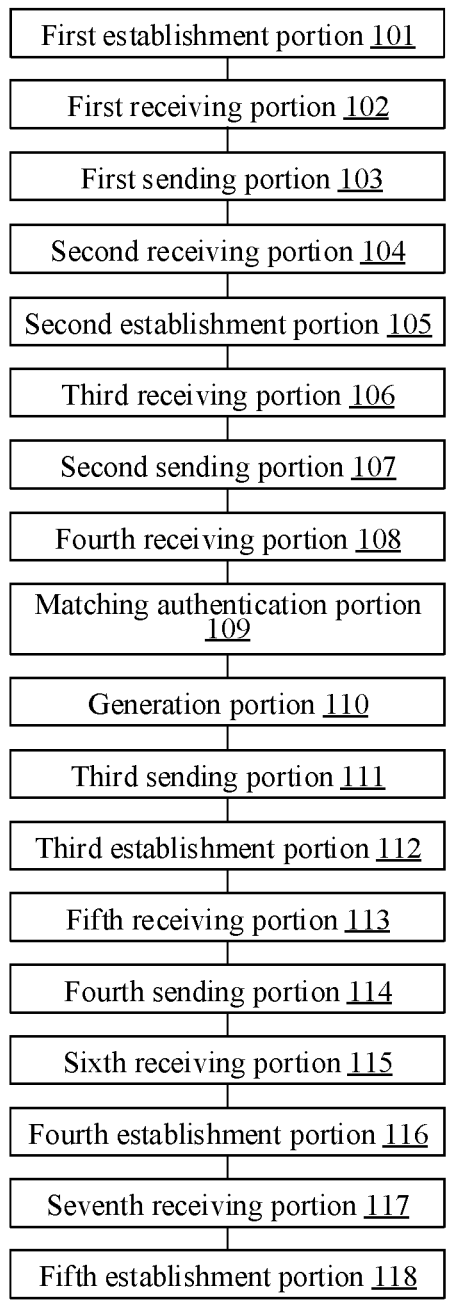
FIG. 6 is a first diagram of a network configuration device according to some embodiments of the present disclosure.

FIG. 6 is a first diagram of a network configuration device, according to some embodiments. The network configuration device is applied to a first device, and referring to FIG. 6, includes:

a first establishment portion 101, configured to establish a first connection with an access gateway based on a first network identifier of the access gateway;

a first receiving portion 102, configured to receive, through the first connection, a first request sent by the access gateway;

a first sending portion 103, configured to send a first connection token in response to the first request;

a second receiving portion 104, configured to receive, through the first connection, a second network identifier encrypted by the access gateway with the first connection token when the access gateway determines that the first connection token is a valid token; and a second establishment portion 105, configured to acquire the second network identifier through decryption and establish a second connection with the access gateway based on the second network identifier for interaction with a second device through the second connection.

In some embodiments, the device further includes:

a third receiving portion 106, configured to receive, through the first connection, a second request sent by the access gateway, and a second sending portion 107, configured to send security capability information containing an encryption algorithm supported by the first device to the access gateway in response to the second request; and the second receiving portion 104 is configured to receive the second network identifier encrypted by the access gateway with the first connection token through the encryption algorithm supported by the first device when the access gateway determines that the first connection token is a valid token.

In some embodiments, the security capability information further contains information about an authentication manner supported by the first device, the authentication manner is configured to be sent to a server by the access gateway, and the device further includes:

a fourth receiving portion 108, configured to receive, through the first connection, security authentication success information provided by the server and forwarded by the access gateway, the security authentication success information being fed back to the access gateway by the server after authenticating the first device and the encrypted second network identifier being sent by the access gateway after receiving the security authentication success information.

In some embodiments, if the security authentication success information contains a first identification code, the device further includes:

a matching authentication portion 109, configured to perform matching authentication based on the first identification code and a second identification code locally stored in the first device, the encrypted second network identifier being sent by the access gateway after receiving matching authentication success information.

In some embodiments, the device further includes:

a generation portion 110, configured to, after the second connection is established with the access gateway, generate a second connection token, the second connection token being configured to identify the first device; and a third sending portion 111, configured to send the second connection token to the server through the access gateway via the second connection.

In some embodiments, the device further includes:

a third establishment portion 112, configured to, responsive to failing to connect to the access gateway using the second network identifier, reestablish the first connection with the access gateway based on the first network identifier;

a fifth receiving portion 113, configured to receive, through the reestablished first connection, a third request sent by the access gateway;

a fourth sending portion 114, configured to send an invalid third connection token in response to the third request, the invalid third connection token being configured to trigger the access gateway to acquire the second connection token from the server;

a sixth receiving portion 115, configured to receive, from the access gateway through the first connection, a third network identifier encrypted with the second connection token; and a fourth establishment portion 116, configured to acquire the third network identifier through decryption and establish a third connection with the access gateway based on the third network identifier for interaction with the second device through the third connection.

In some embodiments, the device further includes:

a seventh receiving portion 117, configured to receive, from the access gateway through the second connection, the third network identifier encrypted with the second connection token, the second connection token being acquired from the server by the access gateway after receiving a setting instruction for the third network identifier; and a fifth establishment portion 118, configured to acquire the third network identifier through decryption and establish the third connection with the access gateway based on the third network identifier for interaction with the second device through the third connection.

Figure 7:
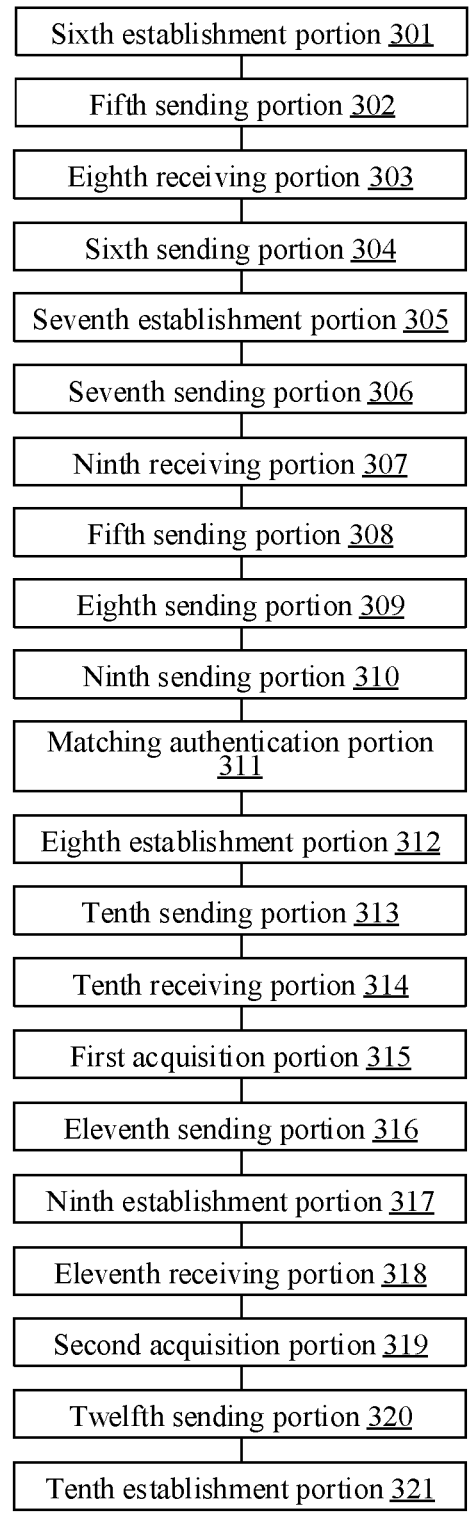
FIG. 7 is a second diagram of a network configuration device according to some embodiments of the present disclosure.

FIG. 7 is a second diagram of a network configuration device, according to some embodiments. The network configuration device is applied to an access gateway, and referring to FIG. 7, includes:

a sixth establishment portion 301, configured to establish a first connection with a first device based on a pre-stored first network identifier;

a fifth sending portion 302, configured to send a first request to the first device through the first connection;

an eighth receiving portion 303, configured to receive a first connection token sent in response to the first request;

a sixth sending portion 304, configured to, responsive to determining that the first connection token is a valid token, encrypt a second network identifier with the first connection token and send it to the first device; and a seventh establishment portion 305, configured to establish a second connection with the first device based on the second network identifier to transmit interaction information between the first device and a second device.

In some embodiments, the device further includes:

a seventh sending portion 306, configured to send a second request to the first device through the first connection, and a ninth receiving portion 307, configured to receive security capability information containing an encryption algorithm supported by the first device from the first device in response to the second request; and the fifth sending portion 308 is configured to send the second network identifier encrypted with the first connection token through the encryption algorithm supported by the first device.

In some embodiments, the security capability information further contains information about an authentication manner supported by the first device; the device further includes:

an eighth sending portion 309, configured to send the security authentication manner to a server, and a ninth sending portion 310, configured to send security authentication success information to the first device through the first connection, the security authentication success information being fed back to the access gateway by the server after authenticating the first device; and the sixth sending portion 304 is configured to, after the security authentication success information is fed back to the first device, send the second network identifier encrypted with the first connection token through the encryption algorithm supported by the first device.

In some embodiments, if the security authentication success information contains a first identification code, the fifth sending portion further includes:

a matching authentication portion 311, configured to perform matching authentication based on the first identification code and a second identification code locally stored in the first device; and the sixth sending portion 304 is configured to, responsive to successful matching authentication, send the second network identifier encrypted with the first connection token through the encryption algorithm supported by the first device.

In some embodiments, the device further includes:

an eighth establishment portion 312, configured to, responsive to that the first device fails to connect to the access gateway using the second network identifier, reestablish the first connection with the first device;

a tenth sending portion 313, configured to send a third request to the first device through the reestablished first connection;

a tenth receiving portion 314, configured to receive an invalid third connection token sent in response to the third request;

a first acquisition portion 315, configured to acquire a second connection token from the server according to the third connection token, the second connection token being updated after the first device establishes the second connection with the access gateway and the second connection token being configured to identify the first device;

an eleventh sending portion 316, configured to send a third network identifier encrypted with the second connection token to the first device through the reestablished first connection; and a ninth establishment portion 317, configured to acquire the third network identifier through decryption and establish a third connection with the first device based on the third network identifier to transmit the interaction information between the first device and the second device.

In some embodiments, the device further includes:

an eleventh receiving portion 318, configured to receive a setting instruction for the third network identifier through the second connection;

a second acquisition portion 319, configured to acquire the second connection token from the server according to the setting instruction, the second connection token being updated after the first device establishes the second connection with the access gateway and the second connection token being configured to identify the first device;

a twelfth sending portion 320, configured to send the third network identifier encrypted with the second connection token to the first device through the second connection; and a tenth establishment portion 321, configured to acquire the third network identifier through decryption and establish the third connection with the first device based on the third network identifier to transmit the interaction information between the first device and the second device.

With respect to the device in the above embodiment, the exemplary manners for performing operations for individual portions therein have been described in detail in the embodiment regarding the method, which will not be elaborated herein.

Figure 8:
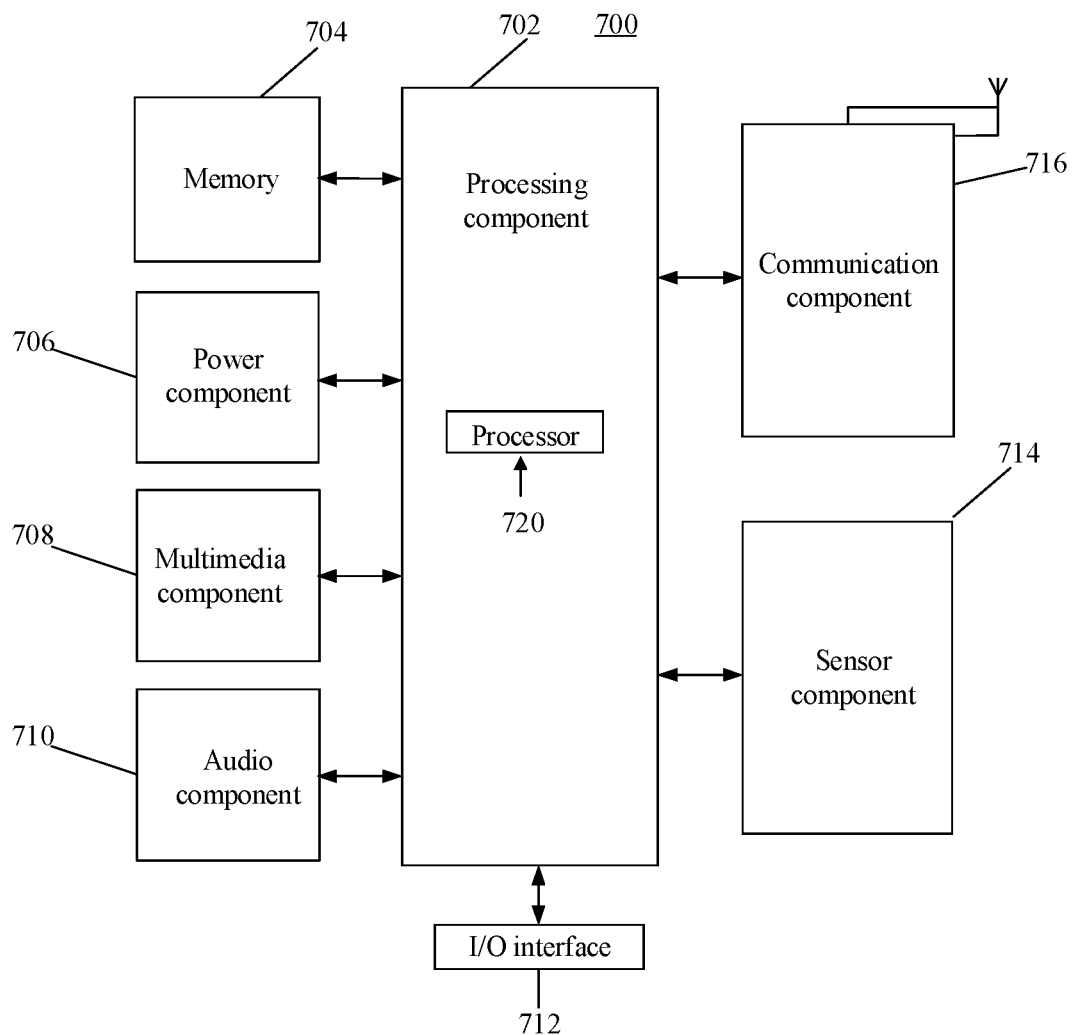
FIG. 8 is a block diagram of a first device according to some embodiments of the present disclosure.

FIG. 8 is a block diagram of a first device, according to some embodiments. For example, the first device 700 may be an intelligent speaker.

Referring to FIG. 8, the first device 700 may include one or more of the following components: a processing component 702, a memory 704, a power component 706, a multimedia component 708, an audio component 710, an Input/Output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the abovementioned method. Moreover, the processing component 702 may include one or more portions which facilitate interaction between the processing component 702 and the other components. For instance, the processing component 702 may include a multimedia portion to facilitate interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 706 provides power for various components of the device 700. The power component 806 may include a power management system, one or more power supplies, and other components associated with generation, management and distribution of power for the device 700.

The multimedia component 708 includes a screen providing an output interface between the device 700 and a user. In some embodiments, the screen may include a Liquid Crystal Display (LCD) and a Touch Panel (TP). In some embodiments, an organic light-emitting diode (OLED) display or other types of displays can be employed.

If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 708 includes a front camera and/or a rear camera. The front camera and/or the rear camera may receive external multimedia data when the device 700 is in an operation mode, such as a photographing mode or a video mode. Each of the front camera and the rear camera may be a fixed optical lens system or have focusing and optical zooming capabilities.

The audio component 710 is configured to output and/or input an audio signal. For example, the audio component 810 includes a Microphone (MIC), and the MIC is configured to receive an external audio signal when the device 700 is in the operation mode, such as a call mode, a recording mode and a voice recognition mode. The received audio signal may further be stored in the memory 804 or sent through the communication component 716. In some embodiments, the audio component 710 further includes a speaker configured to output the audio signal.

The I/O interface 712 provides an interface between the processing component 702 and a peripheral interface portion, and the peripheral interface portion may be a keyboard, a click wheel, a button and the like. The button may include, but not limited to: a home button, a volume button, a starting button and a locking button.

The sensor component 714 includes one or more sensors configured to provide status assessment in various aspects for the device 700. For instance, the sensor component 714 may detect an on/off status of the device 700 and relative positioning of components, such as a display and small keyboard of the device 700, and the sensor component 714 may further detect a change in a position of the device 700 or a component of the device 700, presence or absence of contact between the user and the device 700, orientation or acceleration/deceleration of the device 700 and a change in temperature of the device 700. The sensor component 714 may include a proximity sensor configured to detect presence of an object nearby without any physical contact. The sensor component 714 may also include a light sensor, such as a Complementary Metal Oxide Semiconductor (CMOS) or Charge Coupled Device (CCD) image sensor, configured for use in an imaging APP. In some embodiments, the sensor component 714 may also include an acceleration sensor, a gyroscope sensor, a magnetic sensor, a pressure sensor or a temperature sensor.

The communication component 716 is configured to facilitate wired or wireless communication between the device 700 and another device. The device 700 may access a communication-standard-based wireless network, such as a Wi-Fi network, a 2nd-Generation (2G), 3rd-Generation (3G), 4th-Generation (4G), 5th-Generation (5G) network or a combination thereof. In some embodiments, the communication component 716 receives a broadcast signal or broadcast associated information from an external broadcast management system through a broadcast channel. In some embodiments, the communication component 716 further includes an NFC portion to facilitate short-range communication. For example, the NFC portion may be implemented based on a Radio Frequency Identification (RFID) technology, an Infrared Data Association (IrDA) technology, an Ultra-Wide Band (UWB) technology, a Bluetooth (BT) technology and another technology.

In some embodiments, the device 700 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to perform the abovementioned method.

In some embodiments, there is also provided a non-transitory computer-readable storage medium including an instruction, such as the memory 704 including an instruction, and the instruction may be executed by the processor 720 of the device 700 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

In some embodiments, an instruction in the storage medium can be executed by a processor of a first device to enable the first device to perform a network configuration method, the method including:

a first connection is established with an access gateway based on a first network identifier of the access gateway;

a first request sent by the access gateway is received through the first connection;

a first connection token is sent in response to the first request;

a second network identifier encrypted by the access gateway with the first connection token when the access gateway determines that the first connection token is a valid token is received on the first connection; and the second network identifier is acquired through decryption, and a second connection is established with the access gateway based on the second network identifier for interaction with a second device through the second connection.

Figure 9:
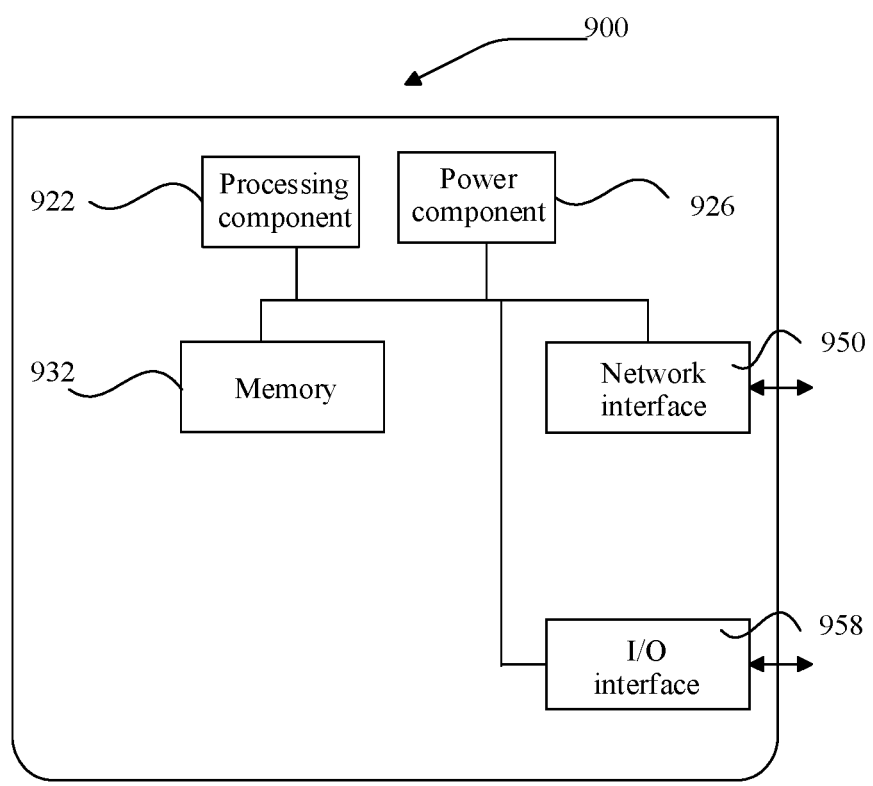
FIG. 9 is a block diagram illustrating an access gateway according to some embodiments of the present disclosure.

FIG. 9 is a block diagram of an access gateway, according to some embodiments. Referring to FIG. 9, the access gateway 800 includes a processor 801, a communication interface 802 and a memory 803.

The processor 801 usually controls overall operations of the access gateway.

The communication interface 802 may enable the access gateway to communicate with another terminal or server through a network.

The memory 803 is configured to store an instruction and APP executable for the processor 501, may further cache data that is to be processed or has been processed by the processor 801 and each portion in the access gateway, and may be implemented by a flash or a RAM.

In some embodiments, an instruction in the storage medium can be executed by a processor of an access gateway to enable the access gateway to perform a network configuration method, the method including that:

a first connection is established with a first device based on a pre-stored first network identifier;

a first request is sent to the first device through the first connection; and a first connection token is received in response to the first request;

responsive to determining that the first connection token is a valid token, a second network identifier is encrypted with the first connection token and sent to the first device; and a second connection is established with the first device based on the second network identifier to transmit interaction information between the first device and a second device.

The various device components, modules, components, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A network configuration method, executed by a first device, the method comprising:
    establishing, by the first device, a first connection with an access gateway based on a first network identifier of the access gateway;
    receiving, by the first device through the first connection, a first request sent by the access gateway;
    sending, by the first device, a first connection token to the access gateway in response to the first request, wherein the first connection token is configured to identify the first device;
    receiving, by the first device through the first connection, a second network identifier encrypted by the access gateway with the first connection token when the access gateway determines that the first connection token is a valid token; and
    acquiring, by the first device, the second network identifier through decryption, and establishing a second connection with the access gateway based on the second network identifier for interaction with a second device through the second connection.

2. The method of claim 1, further comprising:
    receiving, through the first connection, a second request sent by the access gateway; and
    sending security capability information containing an encryption algorithm supported by the first device to the access gateway in response to the second request, wherein receiving the second network identifier encrypted by the access gateway with the first connection token when the access gateway determines that the first connection token is a valid token comprises:
    receiving the second network identifier encrypted by the access gateway with the first connection token through the encryption algorithm supported by the first device when the access gateway determines that the first connection token is a valid token.

3. The method of claim 2, wherein the security capability information further contains information about an authentication manner supported by the first device, wherein information about the authentication manner is configured to be sent to a server by the access gateway, and the method further comprises:
    receiving, through the first connection, security authentication success information provided by the server and forwarded by the access gateway, the encrypted second network identifier being sent by the access gateway after receiving the security authentication success information.

4. The method of claim 3, further comprising: responsive to that the security authentication success information contains a first identification code,
performing matching authentication based on the first identification code and a second identification code locally stored in the first device, the encrypted second network identifier being sent by the access gateway after receiving matching authentication success information.

5. The method of claim 1, further comprising:
after the second connection is established with the access gateway, generating a second connection token, the second connection token being configured to identify the first device; and
sending the second connection token to the server through the access gateway via the second connection.

6. The method of claim 5, further comprising:
responsive to failing to connect to the access gateway using the second network identifier, reestablishing the first connection with the access gateway based on the first network identifier;
receiving, through the reestablished first connection, a third request sent by the access gateway;
sending an invalid third connection token in response to the third request, the invalid third connection token being configured to trigger the access gateway to acquire the second connection token from the server;
receiving, from the access gateway through the first connection, a third network identifier encrypted with the second connection token; and
acquiring the third network identifier through decryption, and establishing a third connection with the access gateway based on the third network identifier for interaction with the second device through the third connection.

7. The method of claim 5, further comprising:
receiving, from the access gateway through the second connection, the third network identifier encrypted with the second connection token, the second connection token being acquired from the server by the access gateway after receiving a setting instruction for the third network identifier; and
acquiring the third network identifier through decryption, and establishing the third connection with the access gateway based on the third network identifier for interaction with the second device through the third connection.

8. A network configuration method, executed by an access gateway, the method comprising:
establishing, by the access gateway, a first connection with a first device based on a pre-stored first network identifier;
sending, by the access gateway, a first request to the first device through the first connection;
receiving, by the access gateway, a first connection token sent from the first device in response to the first request, wherein the first connection token is configured to identify the first device;
responsive to determining that the first connection token is a valid token, encrypting, by the access gateway, a second network identifier with the first connection token and sending an encrypted second network identifier to the first device; and
establishing, by the access gateway, a second connection with the first device based on the second network identifier to transmit interaction information between the first device and a second device.

9. The method of claim 8, further comprising:
sending a second request to the first device through the first connection; and
receiving security capability information containing an encryption algorithm supported by the first device from the first device in response to the second request,
wherein encrypting the second network identifier with the first connection token and sending the encrypted second network identifier to the first device comprises:
sending the second network identifier encrypted with the first connection token through an encryption algorithm supported by the first device.

10. The method of claim 9, wherein the security capability information further contains information about an authentication manner supported by the first device, wherein the method further comprises:
sending the security authentication manner to a server, and
sending security authentication success information to the first device through the first connection, the security authentication success information being fed back to the access gateway by the server after authenticating the first device; and
sending the second network identifier encrypted with the first connection token through the encryption algorithm supported by the first device comprises:
after the security authentication success information is fed back to the first device, sending the second network identifier encrypted with the first connection token through the encryption algorithm supported by the first device.

11. The method of claim 10, further comprising: responsive to that the security authentication success information contains a first identification code,
performing matching authentication based on the first identification code and a second identification code locally stored in the first device, wherein
sending the second network identifier encrypted with the first connection token through the encryption algorithm supported by the first device comprises:
responsive to successful matching authentication, sending the second network identifier encrypted with the first connection token through the encryption algorithm supported by the first device.

12. The method of claim 8, further comprising:
responsive to that the first device fails to connect to the access gateway using the second network identifier, reestablishing the first connection with the first device;
sending a third request to the first device through the reestablished first connection;
receiving an invalid third connection token sent in response to the third request;
acquiring a second connection token from the server according to the third connection token, the second connection token being updated after the first device establishes the second connection with the access gateway and the second connection token being configured to identify the first device;
sending a third network identifier encrypted with the second connection token to the first device through the reestablished first connection; and
acquiring the third network identifier through decryption, and establishing a third connection with the first device based on the third network identifier to transmit the interaction information between the first device and the second device.

13. The method of claim 8, further comprising:
receiving a setting instruction for the third network identifier through the second connection;
acquiring the second connection token from the server according to the setting instruction, the second connection token being updated after the first device establishes the second connection with the access gateway and the second connection token being configured to identify the first device;
sending the third network identifier encrypted with the second connection token to the first device through the second connection; and
acquiring the third network identifier through decryption, and establishing the third connection with the first device based on the third network identifier to transmit the interaction information between the first device and the second device.

14. A network configuration device applied to a first device, comprising:
a processor; and
memory configured to store instructions executable by the processor,
wherein the processor is configured to:
establish a first connection with an access gateway based on a first network identifier of the access gateway;
receive, through the first connection, a first request sent by the access gateway;
send a first connection token in response to the first request, wherein the first connection token is configured to identify the first device;
receive, through the first connection, a second network identifier encrypted by the access gateway with the first connection token when the access gateway determines that the first connection token is a valid token; and
acquire the second network identifier through decryption and establish a second connection with the access gateway based on the second network identifier for interaction with a second device through the second connection.

15. The network configuration device of claim 14, wherein the processor is further configured to:
receive, through the first connection, a second request sent by the access gateway; and
send security capability information containing an encryption algorithm supported by the first device to the access gateway in response to the second request,
wherein in order to receive the second network identifier encrypted by the access gateway with the first connection token when the access gateway determines that the first connection token is a valid token, the processor is configured to:
receive the second network identifier encrypted by the access gateway with the first connection token through the encryption algorithm supported by the first device when the access gateway determines that the first connection token is a valid token.

16. The network configuration device of claim 15, wherein the security capability information further contains information about an authentication manner supported by the first device, wherein the authentication manner is configured to be sent to a server by the access gateway, and the processor is further configured to:
receive, through the first connection, security authentication success information provided by the server and forwarded by the access gateway, the security authentication success information being fed back to the access gateway by the server after authenticating the first device and the encrypted second network identifier being sent by the access gateway after receiving the security authentication success information.

17. The network configuration device of claim 16, wherein the processor is further configured to: if the security authentication success information contains a first identification code
perform matching authentication based on the first identification code and a second identification code locally stored in the first device, the encrypted second network identifier being sent by the access gateway after receiving matching authentication success information.

18. A network configuration device implementing the network configuration method of claim 8, comprising:
a processor; and
memory configured to store instructions executable by the processor,
wherein the processor is configured to perform steps of the network configuration method.

19. A non-transitory computer-readable storage medium having stored thereon instructions that, when executed by a processor of a first device, cause the first device to perform the network configuration method of claim 1.

20. A network system implementing the method of claim 8, comprising:
the first device; and
the access gateway configured to:
establish the first connection with the first device based on the pre-stored first network identifier;
send the first request to the first device through the first connection;
receive the first connection token sent from the first device in response to the first request, wherein the first connection token is configured to identify the first device;
responsive to determining that the first connection token is a valid token, encrypt the second network identifier with the first connection token and send the encrypted second network identifier to the first device; and
establish the second connection with the first device based on the second network identifier to transmit interaction information between the first device and a second device;
wherein the second network identifier received by the first device and configured for network configuration is transmitted after being encrypted by the access gateway with the first connection token of the first device, such that security of the second network identifier received by the first device is ensured without manual operation of a user or a network configuration button on the first device.

* * * * *